United States Patent [19]

Tackett, Jr. et al.

[11] Patent Number: 5,048,609
[45] Date of Patent: Sep. 17, 1991

[54] SELECTIVE PERMEABILITY REDUCTION IN A SUBTERRANEAN HYDROCARBON-BEARING FORMATION USING A NONSELECTIVE GEL

[75] Inventors: James E. Tackett, Jr., Littleton; LaVaun S. Merrill, Jr., Englewood, both of Colo.

[73] Assignee: Marathon Oil Company, Findlay, Ohio

[21] Appl. No.: 627,294

[22] Filed: Dec. 14, 1990

[51] Int. Cl.$^5$ ............................................. E21B 33/138
[52] U.S. Cl. ...................................... 166/295; 166/285; 166/300
[58] Field of Search .............. 166/270, 285, 292, 294, 166/295, 300, 305.1, 312

[56] References Cited

U.S. PATENT DOCUMENTS

| | | | |
|---|---|---|---|
| 4,261,421 | 4/1981 | Watanabe | 166/300 X |
| 4,343,363 | 8/1982 | Norton et al. | 166/300 X |
| 4,361,186 | 11/1982 | Kalina | 166/270 X |
| 4,488,601 | 12/1984 | Hammett | 166/270 |
| 4,683,949 | 8/1987 | Sydansk et al. | 166/270 |
| 4,809,781 | 3/1989 | Hoefner | 166/273 |
| 4,848,464 | 7/1989 | Jennings, Jr. et al. | 166/270 |
| 4,899,818 | 2/1990 | Jennings, Jr. et al. | 166/270 |
| 4,928,763 | 5/1990 | Falk | 166/300 X |
| 4,964,466 | 10/1990 | Williams et al. | 166/305.1 X |
| 4,986,356 | 1/1991 | Lockhart et al. | 166/300 |

OTHER PUBLICATIONS

G. Burrafato et al., "A New, Mild Chemical Method for the Degelation of Cr+3—Polyacrylamide Gel", USMS 019354, Society of Petroleum Engineers, 1989.

*Primary Examiner*—George A. Suchfield
*Attorney, Agent, or Firm*—Jack L. Hummel; Jack E. Ebel

[57] ABSTRACT

Selective permeability reduction is achieved in a heterogeneous treatment zone of a subterranean hydrocarbon-bearing formation by initially placing a nonselective permeability-reducing material in the high and low permeability regions of the treatment zone. Thereafter, a permeability-restoring agent is placed in the regions behind the permeability-reducing material. The agent contacts all of the material in the low permeability region, reacting with it to restore permeability thereto. However, the agent is consumed by reaction before it contacts all of the material in the high permeability region, thereby leaving a sufficient amount of material in the high permeability region to achieve selective permeability reduction therein.

14 Claims, No Drawings

SELECTIVE PERMEABILITY REDUCTION IN A SUBTERRANEAN HYDROCARBON-BEARING FORMATION USING A NONSELECTIVE GEL

BACKGROUND OF THE INVENTION

1. Technical Field

The invention relates to the recovery of hydrocarbons and more specifically to a process for selectively reducing the permeability of a subterranean hydrocarbon-bearing formation.

2. Background Information

During recovery of hydrocarbons from a heterogeneous subterranean hydrocarbon-bearing formation, materials are often placed in the formation to modify the permeability of the formation and improve hydrocarbon recovery therefrom. For example, U.S. Pat. No. 4,683,949 to Sydansk et al discloses a process which utilizes a crosslinked polymer gel to selectively reduce permeability in the formation. Selectivity in this context is the ability to reduce permeability in the high permeability regions of the formation without reducing permeability in the low permeability regions thereof.

Permeability-reducing polymer gels known in the art, such as those disclosed in Sydansk et al, have been shown to be inherently more resistant to penetration of the low permeability regions of the formation than the high permeability regions, which is a favorable selectivity characteristic. Nevertheless, it has been found that when such gels are injected into heterogeneous formations, they usually penetrate not only the high permeability regions, but to some extent the low permeability regions. This problem is particularly acute when the difference between the permeabilities of the two regions is relatively small.

U.S. Pat. No. 4,809,781 to Hoefner, like Sydansk et al, is a permeability reduction process which relies on the inherent selectivity of a permeability-reducing material in a heterogeneous formation. The process of Hoefner is initiated by injecting a selective permeability-reducing material through a well bore into a treatment zone. The selective material must be chosen such that it is capable of penetrating the high permeability regions of the zone, but not the low permeability regions. Consequently, a portion of the selective material enters the high permeability region while the remainder accumulates at the face of the low permeability region thereby plugging the face.

A nonselective permeability-reducing material is subsequently injected into the well bore following the selective material. The selective material plugging the face of the low permeability region prevents entry of the nonselective material therein. As a result, the nonselective material is diverted into the high permeability region where it beneficially fortifies the selective material already in place. Finally, a chemical agent is injected into the well bore to remove the selective material from the face of the low permeability region and restore fluid pathways thereto.

The process of Hoefner requires careful selection of materials and rigorous process control for successful operation. However, it is extremely difficult to choose a selective permeability-reducing material which will perform as desired. If the material is not sufficiently selective it will penetrate the low permeability region, in which case the low permeability region will suffer unacceptable permeability damage. It is possible to reverse permeability damage with a strong reversing agent, but the agent is also likely to attack the permeability-reducing material in the high permeability region, thereby destroying the effectiveness of the entire permeability reduction treatment.

Processes have been developed for selective placement of permeability-reducing materials in subterranean hydrocarbon-bearing formations, which do not rely on the inherently selective properties of the permeability-reducing materials, but rely on more intrusive means of placement. Mechanical zone isolation is one such means for selective placement of materials in a treatment zone. The zone isolation equipment is designed to mechanically direct a permeability-reducing material exclusively into a high permeability region. However, mechanical zone isolation is ineffective where radial pathways exist which enable the injected material to bypass the zone isolation equipment and enter the low permeability regions.

As such, a process is needed for selectively placing a permeability-reducing material in a high permeability region of a subterranean formation without a significant risk of substantially damaging low permeability regions in fluid communication therewith. Specifically, a process is needed for the selective placement of a permeability-reducing material in a subterranean hydrocarbon-bearing formation which is relatively insensitive to the selectivity of the permeability-reducing material. Furthermore, a selective placement process is needed which is simpler and more economical, yet more effective, than conventional mechanical zone isolation processes.

SUMMARY OF THE INVENTION

The present invention is a process for selectively reducing permeability in a heterogeneous treatment zone of a subterranean hydrocarbon-bearing formation. The process is initiated by injecting a nonselective permeability-reducing material into the treatment zone via a well bore in fluid communication therewith. The material nonselectively enters both the low permeability and high permeability regions of the zone. However, the depth of radial penetration by the material into the high permeability region is substantially greater than into the low permeability region due to the more restrictive flow paths in the low permeability region.

Following placement of the permeability-reducing material in the treatment zone, a permeability-restoring agent is injected into the well bore. The agent is selected as a function of its diffusion rate and reaction rate with the permeability-reducing material. Specifically, the agent is selected such that the time required for substantially all of the agent to react to completion with substantially all of the permeability-reducing material in the low permeability region is approximately equal to the time required for the agent to diffuse through the permeability-reducing material a distance corresponding to the material's maximum radial depth of penetration in the low permeability region.

Accordingly, the injected permeability-restoring agent diffuses through the permeability-reducing material in both the high and low permeability regions, simultaneously reacting with the permeability-reducing material contacted therein until all of the agent is consumed. The properly selected agent reacts with substantially all of the permeability-reducing material in the low permeability region, but not all of the material in the high permeability region, before it is consumed.

The agent is unable to contact the permeability-reducing material which has penetrated deeper into the high permeability region than the maximum depth of penetration into the low permeability region because at the point of the maximum depth all of the agent is consumed by reaction with the permeability reducing material. Consequently, the uncontacted portion of the permeability-reducing material remains in the high permeability region after the permeability-restoring agent is consumed and desirably maintains permeability reduction therein. In this manner, selective permeability reduction in the high permeability region of the treatment zone is achieved.

DESCRIPTION OF THE PREFERRED EMBODIMENTS

The process of the present invention employs a nonselective permeability-reducing material in conjunction with a permeability-restoring agent to selectively reduce permeability in a heterogeneous treatment zone of a subterranean hydrocarbon-bearing formation. The process effectively reduces the permeability of a high permeability region in the treatment zone without significantly damaging a low permeability region in the treatment zone and in fluid communication with the high permeability region.

To better understand the invention the following terms as used herein are defined:

A "heterogeneous zone" or a "heterogeneous formation" is a subterranean geological structure which contains a region of high permeability and a region of low permeability wherein the regions are in fluid communication with one another.

A "high permeability region" is a region of the treatment zone which has a higher permeability relative to a low permeability region of the zone. Correspondingly, a "low permeability region" is a region of the zone which has a lower permeability relative to a high permeability region of the zone.

A "treatment zone" is simply a volume in the formation wherein selective permeability reduction is desired.

"Selective permeability reduction" is the reduction of permeability in the high permeability region of the treatment zone with the absence of substantial perrmeability reduction is the low permeability region of the zone.

A "selective material" substantially penetrates a high permeability region of a treatment zone to the substantial exclusion of a low permeability region of a zone. Conversely, a "nonselective material" substantially penetrates to at least some radial depth both high and low permeability regions of a treatment zone, although the depth of penetration in each region may be unequal and in the present process is in fact greater in the high permeability region.

"Damage" is permeability reduction which significantly diminishes hydrocarbon productivity or fluid injectivity into or through a treatment zone.

The preferred nonselective permeability-reducing material of the present invention is a crosslinked polymer gel. The "gel" is a continuous three-dimensional crosslinked polymeric network which has a liquid occupying the interstices of the network. The crosslinked polymeric network provides the gel structure. The term "flowing gels" as used herein refers to gels which are displaceable within the formation by fluids injected into the formation, or by fluids produced from the formation while "non-flowing gels" are essentially not displaceable in the formation by such fluids.

Gels are further characterized as either "mature" or "immature". A mature gel is one in which crosslinking of the polymer by the crosslinking agent has proceeded to substantial completion either because the crosslinking agent or the crosslinking sites have been substantially consumed. An immature gel is a gel in which crosslinking has not gone to completion because a substantial quantity of available crosslinking sites and crosslinking agent remain. The terms "crosslinking" and "gelation" are used synonymously herein.

When the present gels are broken or reversed, they revert to an aqueous solution which is substantially free of structure. Such solutions have properties equivalent to a polymer solution free of the crosslinking agent, i.e., the solution is substantially less viscous than the predecessor gel.

The preferred crosslinked polymer gel of the present invention comprises a crosslinkable polymer, a crosslinking agent and an aqueous solvent. The crosslinkable polymer is preferably a carboxylate-containing polymer and more preferably an acrylamide-containing polymer. Of the acrylamide-containing polymers, the most preferred are polyacrylamide (PA), partially hydrolyzed polyacrylamide (PHPA), copolymers of acrylamide and acrylate, and carboxylate-containing terpolymers of acrylate. PA, having utility herein, has from about 0.1% to about 3% of its amide groups hydrolyzed. PHPA, as defined herein, has greater than about 3% of its amide groups hydrolyzed.

The crosslinking agent preferably effects crosslinking between the carboxylate sites of the same or different polymer molecules within the gel. Polymer crosslinking creates the network structure of the gel. The crosslinking agent is preferably a molecule or complex containing a reactive transition metal cation. A most preferred crosslinking agent comprises a trivalent chromium cation complexed or bonded to an anion, atomic oxygen or water. Exemplary crosslinking agents are compounds or complexes containing chromic acetate and/or chromic chloride. Other transition metal cations which are found in crosslinking agents having utility in the present invention, although less preferred, are chromium VI within a redox system, aluminum III, iron II, iron III and zirconium IV.

The aqueous gel may be prepared in any aqueous solvent in which the polymer and crosslinking agent can be dissolved, mixed, suspended or otherwise dispersed to facilitate gel formation. The solvent is preferably an aqueous liquid such as distilled water, fresh water or a brine.

A number of the most preferred gels which have utility within the present invention are taught in U.S. Pat. No. 4,683,949 which is incorporated herein by reference.

The gel used in the present invention is formed by admixing the polymer, crosslinking agent, and solvent at the surface in a gelation solution. Surface admixing broadly encompasses inter alia mixing of the gel components in bulk at the surface prior to injection or simultaneously mixing the gel components at or near the wellhead by an in-line mixing means while injecting them. Crosslinking is initiated in the gelation solution as soon as the polymer and crosslinking agent contact, thereby forming an immature gel. Crosslinking will proceed under favorable conditions until the immature gel reaches maturity.

The present selective permeability reduction process is practiced by preparing the gelation solution in the manner described above and injecting the resulting nonselective immature flowing gel as a continuous slug into a desired heterogeneous treatment zone of the formation via a well bore in fluid communication therewith.

The injected gel nonselectively penetrates both the low permeability and high permeability regions of the treatment zone. However, due to the permeability difference between the regions, the radial depth of penetration into the high permeability region is substantially greater than the radial depth of penetration into the low permeability region.

Following placement of the flowing immature gel in the treatment zone, the well bore is shut in for a time sufficient to enable the gel to crosslink to maturity. The resulting mature gel sets up in both the high permeability region and low permeability region of the treatment zone and substantially reduces permeability therein up to the maximum radial depth of penetration in each of the regions.

The well bore is reopened and the permeability-restoring agent is then injected into the treatment zone via the well bore in a continuous slug. The agent is a nonselective liquid which is chosen as a function of its in situ diffusion and reaction rates in the gel. The reactive agent is preferably capable of effectuating gel reversal. Thus, as the injected agent diffuses through the gel along a radial path from the well bore, it simultaneously reverses the gel it contacts. The diffusion and reaction rates of the selected agent in the gel are such that substantially all of the agent is consumed by reaction when it reaches a radial depth in the treatment zone coinciding with the maximum depth of gel penetration in the low permeability region of the treatment zone.

Consequently, the agent reverses substantially all of the gel in the low permeability region. The gel, which is in the high permeability region at a radial depth greater than the maximum depth of diffusion of the agent, remains therein essentially intact and undisturbed. This remaining gel maintains substantial permeability reduction in the high permeability region, while no substantial permeability reduction is maintained in the low permeability region, the reversed gel having little or no permeability-reducing effect.

Specific permeability-restoring agents satisfying the above-recited performance requirements are selected from a class of materials commonly termed gel breakers. Preferred gel breakers for use with the gels of the present invention are ligands and their precursors, and more preferably carboxylate-containing ligands (alternatively termed chelating agents), or amide or ester precursor of such ligands. Such compositions typically and beneficially have a relatively large molecular size and geometry to slow diffusion through the gel, yet are readily reactive with the gel.

The most preferred ligands for use in the present invention are malonic, oxalic and succinic acid and their corresponding salts. Amide and ester precursors of such ligands, which react to form the ligands in the presence of the gels are also effective as permeability-restoring agents in the present invention. The most preferred of the ester precursors are malonates, oxalates, succinates, such as dimethyl malonates and dimethyl oxalates, and derivatives thereof. The most preferred of the amide precursors are malonamide, oxalamide, succinamide, and derivatives thereof.

Although the present invention is not limited to any particular mechanism, the utility of the carboxylate-containing ligands is believed to derive from their ability to compete with the crosslinking sites of the polymer for the metal cation crosslinking agent. If the ligand is sufficiently strong, it will remove the cation from the crosslinking site and chelate the cation to form a chelate complex. As a consequence, the crosslink bonds of the gel are destroyed and the gel is reversed, losing its structure and reverting to a watery solution. Generally, ligands which have an equilibrium constant with the crosslinking cation greater than 15 perform satisfactorily in the present invention.

The following example demonstrates the practice and utility of the present invention, but is not to be construed as limiting the scope of the invention.

EXAMPLE

Several gel samples are prepared from a gelation solution having the following properties. The polyacrylamide concentration in the gelation solution is 3.0%. The polymer is 2.5% hydrolyzed and has a molecular weight of 280,000. The crosslinking agent in the solution is chromic acetate at a concentration of 0.25%.

Seven of the gel samples are placed in separate glass tubes, each having dimensions of 5 mm $\times$ 17 cm. Each sample has a volume of 1 ml. The samples are allowed to mature for 20 hours at 60° C. Thereafter, different malonic acid solutions, each having a volume of 0.5 ml, are placed in the tubes with the gel samples. Each malonic acid solution has the same pH of 4.7, but the concentrations of these solutions are varied.

The depth of malonic acid penetration, i.e., diffusion, is indicated by the level of the interface between the mature gel and the reversed gel. After 6 days the depth of penetration is recorded as a function of malonic acid concentration in the solution initially added to the tube. The results are summarized in the table below wherein depth of penetration is expressed as the percentage of penetration relative to the original depth of the sample in the tube.

TABLE

| Sample No. | Malonic Acid Concentration % | Percent Penetration |
| --- | --- | --- |
| 1 | 5.0 | 98 |
| 2 | 2.0 | 66 |
| 3 | 1.0 | 52 |
| 4 | 0.5 | 27 |
| 5 | 0.2 | 15 |
| 6 | 0.1 | 6 |
| 7 | 0.05 | 2 |

The results indicate that sodium malonate reacts sufficiently fast relative to its diffusion rate through the gel. Therefore, it would have utility in the present invention if the experimental temperature approximates the formation temperature of interest and the depth of diffusion corresponds to the maximum depth of penetration for the gel in the low permeability region of interest.

The results further demonstrate that the optimum permeability-restoring agent will vary in each case as a function of formation temperature and penetration depth. Generally, the diffusion rate and reaction rate of the agent will increase as temperature increases, but not necessarily by the same amount. Therefore, selection of an optimum agent can readily be based on empirical data simulating the formation conditions of temperature and penetration depth in the manner shown above.

While the particular selective permeability reducing process as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

We claim:

1. A process for selectively reducing permeability in a heterogeneous treatment zone of subterranean hydrocarbon-bearing formation having a region of high permeability and a region of low permeability in fluid communication with one another and with a well bore, the process comprising:

injecting a nonselective permeability-reducing material into said treatment zone via said well bore such that said material penetrates said low permeability region to a first radial depth from said well bore to reduce permeability therein and said material penetrates said high permeability region to a second radial depth from said well bore to reduce permeability therein, wherein said second radial depth is greater than said first radial depth;

preselecting a permeability-restoring agent having a diffusion rate through said material and a reaction rate with said material such that substantially all of said agent is consumed in reaction with said material by the time said agent diffuses through said material in said low permeability region up to said first radial depth;

injecting said agent into said treatment zone via said well bore; and reacting said agent with said material in said low permeability region up to said first radial depth to substantially restore permeability therein while maintaining said material in said high permeability region beyond said first radial depth to substantially retain permeability reduction in said high permeability region.

2. The process of claim 1 wherein said nonselective permeability-reducing material is a crosslinked polymer gel.

3. The process of claim 2 wherein said gel is a flowing immature gel when said gel penetrates said high permeability and low permeability regions.

4. The process of claim 3 further comprising shutting in said well bore for a time sufficient to crosslink said immature gel to substantial maturity in said high and low permeability regions prior to injecting said agent into said treatment zone.

5. The process of claim 2 wherein said gel comprises an acrylamide-containing polymer.

6. The process of claim 2 wherein said polymer is selected from the group consisting of polyacrylamide and partially hydrolyzed polyacrylamide.

7. The process of claim 2 wherein said gel comprises a metal cation-containing crosslinking agent.

8. The process of claim 7 wherein said metal cation is chromium.

9. The process of claim 1 wherein said permeability-restoring agent is selected from the group consisting of malonic acid, oxalic acid, succinic acid, salts thereof, esters thereof, amides thereof, and derivatives thereof.

10. A process for selectively reducing permeability in a heterogeneous treatment zone of a subterranean hydrocarbon-bearing formation having a region of high permeability and a region of low permeability in fluid communication with one another and with a well bore, the process comprising:

injecting a nonselective flowing immature crosslinked polymer gel into said treatment zone via said well bore;

placing said flowing immature gel in said low permeability region at a first radial depth and in said high permeability region at a second radial depth greater than said first radial depth;

crosslinking said flowing immature gel at least partially to completion in said high and low permeability regions thereby substantially reducing the permeability of said high and low permeability regions;

preselecting a nonselective gel breaker having a diffusion rate through said at least partially crosslinked gel and a reaction rate with said at least partially crosslinked gel such that substantially all of said gel breaker is consumed in reaction with said gel when said gel breaker diffuses through said gel in said low permeability region up to said first radial depth;

injecting said gel breaker into said treatment zone via said well bore; and reacting said gel breaker with said gel in said low permeability region up to said first radial depth to reverse said gel and substantially restore permeability therein while retaining said gel in said high permeability region beyond said first radial depth to substantially maintain permeability reduction in said high permeability region.

11. The process of claim 10 wherein said gel comprises an acrylamide-containing polymer.

12. The process of claim 10 wherein said gel comprises a metal cation-containing crosslinking agent.

13. The process of claim 12 wherein said gel breaker is selected from the group consisting of ligands of said metal cation, ester precursors of said ligands and amide precursors of said ligands.

14. The process of claim 13 wherein said ligands are selected from the group consisting of malonic acid, oxalic acid, succinic acid, and salts thereof.

* * * * *